United States Patent [19]
Boll et al.

[11] Patent Number: 5,715,963
[45] Date of Patent: Feb. 10, 1998

[54] CLOSING DEVICE FOR THE FUELING OPENING OF A MOTOR VEHICLE TANK

[75] Inventors: Wolf Boll, Weinstadt; Reinhard Steinkämper, Winnenden; Marianne Schwiedessen, Stuttgart, all of Germany

[73] Assignee: Mercedes-Benz AG, Stuttgart, Germany

[21] Appl. No.: 600,267

[22] Filed: Feb. 9, 1996

[30] Foreign Application Priority Data

Feb. 9, 1995 [DE] Germany ............... 195 04 265.4

[51] Int. Cl.$^6$ .................................................. B65B 3/00
[52] U.S. Cl. ...................... 220/86.2; 220/264; 220/284
[58] Field of Search ............................. 220/86.1, 86.2, 220/264, 284, DIG. 33

[56] References Cited

U.S. PATENT DOCUMENTS

| | | | |
|---|---|---|---|
| 3,133,741 | 5/1964 | Garabello | 220/86.2 X |
| 4,941,587 | 7/1990 | Terada | 220/86.2 X |
| 5,271,438 | 12/1993 | Griffin et al. | 220/86.2 X |
| 5,465,861 | 11/1995 | Kunz et al. | |

FOREIGN PATENT DOCUMENTS

| | | |
|---|---|---|
| 0 153 677 | 9/1985 | European Pat. Off. . |
| 0602440A1 | 6/1994 | European Pat. Off. . |
| 4243883A1 | 6/1994 | Germany . |

*Primary Examiner*—Stephen Cronin
*Attorney, Agent, or Firm*—Evenson, McKeown, Edwards & Lenahan P.L.L.C.

[57] ABSTRACT

A closing device for the filler neck of a motor vehicle tank, in which device an orifice of the filler neck, opening into the tank interior can be closed by means of a cap which can be placed sealingly onto the orifice edge under a closing force. The closing force is exerted by a spring. The nozzle of a filling pump to be introduced into the filler neck can operate opening movement of the cap. The cap can be displaced between the closing and the opening position via an actuating mechanism by means of a variable transmission ratio having a value decreasing from the closing position of the cap to its open position and by means of a variable closing force having a value increasing from the open position of the cap to the closing position.

19 Claims, 1 Drawing Sheet

CLOSING DEVICE FOR THE FUELING OPENING OF A MOTOR VEHICLE TANK

BACKGROUND AND SUMMARY OF THE INVENTION

The invention relates to a closing device for the filler neck of a motor-vehicle tank of the type which can be actuated by the nozzle of a fuel filling pump.

Closing devices of the type contemplated by the invention are designed to be opened automatically as a result of the introduction of the nozzle of a filling pump and to be closed automatically when the filler pump is removed. Such a closing device is, in particular, to allow so-called robot refuelling, in which the filling pump is guided into the filler neck of a motor-vehicle tank under the control of robots.

An object of the present invention is to provide such a closing device so that it is capable of being actuated with minimal effort by the nozzle of the filling pump and, furthermore, so that it guarantees an absolutely reliable closure.

The present invention achieves this object by providing a closing device for an opening in a filler neck leading into a motor vehicle fuel tank, comprising a cap sealingly engageable with the opening, an actuating member which is movable by insertion of a filling pump nozzle in said filler neck, and a control mechanism operably connecting the actuating member with the cap to control opening and closing movement of the cap with decreasing force on the cap in a cap closing direction during movement of the cap from a closed to an open position.

The solution according to preferred embodiments of the invention is based on the notion of loading the cap with a high closing force in its closing position and, on the other hand, of ensuring that, by means of a mechanical transmission ratio, this high closing force on the one hand can be overcome by a relatively low force originating from the nozzle of a filling pump and on the other hand decreases in magnitude while the cap is opening.

In especially preferred practical embodiments of the invention the control mechanism includes a spring continuously biasing the cap toward the closing position. This spring is advantageously a leg spring mounted at a pivot axle for the actuating member.

In preferred practical embodiments of the invention, the actuating member is a drive lever which is pivotable by the pump nozzle against the force of the spring. The control mechanism includes a pivotally mounted cap carrying lever pivotally connecting the cap carrying lever with the drive lever.

In certain preferred embodiments the actuation member protrudes into the filler neck to be directly engaged by the fuel supply nozzle. In certain other preferred embodiments the actuating member is actuated by a sliding sleeve in the filler neck, which sliding sleeve is directly engaged by the fuel supply nozzle.

Other objects, advantages and novel features of the present invention will become apparent from the following detailed description of the invention when considered in conjunction with the accompanying drawings.

DETAILED DESCRIPTION OF THE DRAWINGS

Figure 1:
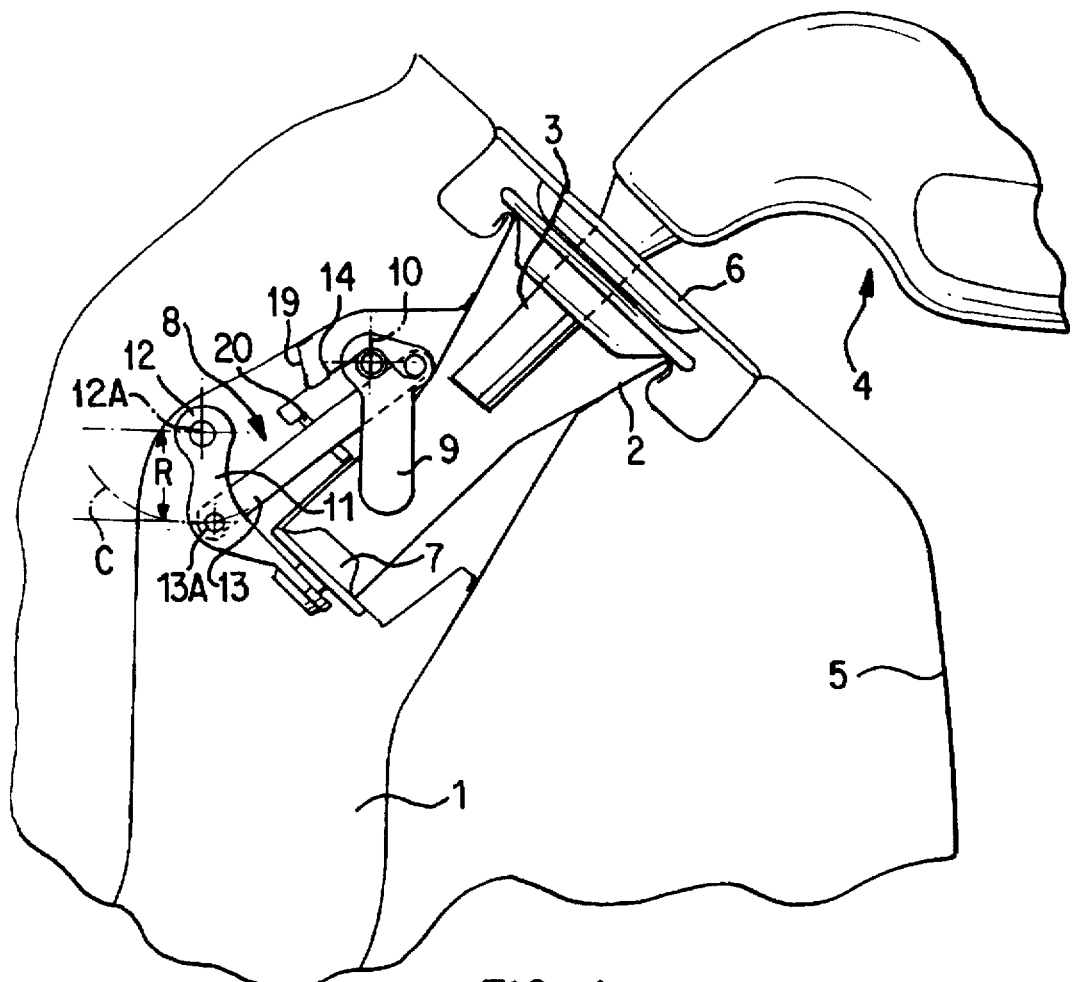
FIG. 1 is a schematic, part sectional, showing of a closing device for the filler neck of a motor-vehicle tank, with a drive lever of an actuating mechanism of the closing device, projecting into the interior of the filler neck, constructed according to a preferred embodiment of the present invention.

Referring to FIG. 1, a tank 1 of a motor vehicle possesses a filler neck 2, through which it can be filled by means of the nozzle 3 of a filling pump 4.

The outward-pointing end of the filler neck 2 is shaped to merge into the body 5 of a vehicle. The outward-pointing orifice of the filler neck is closed by means of a protective cover 6 for protection against dirt and rain. This protective cover 6 can, for example, be articulated on the body 5 via a hinge. At the same time, the protective cover 6 can, in particular, be designed in such a way that it can be opened and closed by the refuelling robot in order to allow a robot-controlled refuelling operation. The constructive measures necessary for this purpose will not be dealt with any further here, since these are unimportant as regards the essential parts of the present invention and since one skilled in the pertinent art could readily construct devices for accommodating opening and closing of the cover 6 with a refueling robot. For example, a hinged cover 6 biased by a spring to its closing position and pivotably movable inwards of the filler neck 2 when abuttingly engaged by the nozzle 3 could be used.

A cap 7 ensures a pressure-tight closure of the tank relative to the outside, which cap 7 is pressed via a spring-loaded lever mechanism 8 onto the inward pointing orifice of the filler neck 2.

The construction and functioning of the lever mechanism 8 are as follows.

The actuation of the lever mechanism 8 takes place via a pivotable drive lever 9. The latter projects into the interior of the filler neck 2, so as to be capable of being pivoted by the nozzle 3 of the filling pump 4 abuttingly engaging same. This drive lever 9 is mounted on a shaft 10 extending perpendicularly to a plane which dissects the filler neck 2. A pivoting lever 11, which pivots about a shaft 12 extending parallel to the shaft 10, presses the cap 7 carried on the end of lever 11 onto the orifice of the filler neck 2. A rigid coupling member 13 connects the drive lever 9 to the pivoting lever 11, for which purpose it is articulated on each of the two last-mentioned levers 11 and 9.

The closing force for pressing the cap 7 onto the filler neck 2 is generated by a leg spring 14 which is coiled about the shaft 10 and is articulated on the drive lever 9 on the one hand and on the tank 1 on the other hand. The force of this leg spring 14 is oriented in such a way that the cap 7 is loaded in the closing position. A torque appropriate for achieving the above-mentioned force is exerted on the drive lever 9 by the leg spring 14. The location of the movable pivot connection 13A of the coupling member 13 on the drive lever 9 with respect to the fixed pivotal connection 12A of the pivoting lever 11 is such that, with the cap 7 closed, a high transmission ratio between the drive lever 9 and the pivoting lever 11 is provided. Thus, a relatively large pivot angle of the drive lever 9, on which the filling pump 4 acts by means of its nozzle 3, is necessary in order to move the cap 7 slightly out of its closing position. With an increasing opening position of the cap 7, the transmission ratio decreases due to movement of the pivot 13A along circular arc C defined by the radius R and the fixed location pivot connection 12A, so that relatively long displacement travels of the cap 7 can be achieved by means of relatively short displacement travels of the nozzle 3 when the cap 7 is moved beyond its initial opening position.

The use of a leg spring 14 exerting a torque on the drive lever 9 about its axis of rotation facilitates a variable closing force for the cap 7, to the effect that the closing force is at its highest with the cap 7 closed. The lever mechanism 8 as described and shown, in combination with the leg spring 14, assures the desired opening and closing movement and forces on the cap 7.

So that the drive lever 9 can be guided into the interior of the filler neck 2, the filler neck 2 must be provided with an axially extending slot. A connection can thereby be made via this slot between the interior of the tank 2 and the atmosphere by way of the interior of the filler neck 2. So that this can be prevented, a seal is necessary. In principle, such a seal can be provided by closing the interior of the tank 2 sealingly by means of a partition 19 in relation to the slot present in the filler neck 2 for the drive lever 9. So that this sealing closure can be achieved, a soft seal 20 is provided in the partition 19 in a passage necessary for the lever 13 according to the illustrated embodiment of FIG. 1. This type of sealing is one of several sealing arrangements contemplated by the present invention. In certain contemplated preferred practical embodiments a chambering of the slot for the drive lever 9 would preferably be made from sides of the tank 1 relative to the filler neck 2, with a seal at the shaft 10 at a lead-through through this chamber. In the last-mentioned design, the shaft 10 would be connected fixedly to the drive lever 9 and be articulated in an outer bearing connected to the tank 1 or to the filler neck 2. The coupling member 13 would then be located outside that chamber and would be fixedly connected to the drive lever 9 via the shaft 10.

A transmission of force from the nozzle 3 of the filling pump 4 to an adjusting mechanism of the cap 7 can also be achieved via linear screwing as an alternative to the designs described above, according to other contemplated embodiments of the present invention.

Also, in principle, a slotted-link transmission, which alternatively could be represented, for example, by a non-linearly transmitting chain leaf together with chain, is also contemplated by certain preferred embodiments of the invention. Such a design affords sealing advantages along with essential independence from tolerances and signs of settling of seals to be used.

The distance, given in the representation according to FIG. 1, between the drive lever 9 and that end of the filler neck 2 closed by the cap 7 can, in practice, be made larger than that shown in order to provide a widened calming space against foam formation, for example in the case of filling with diesel fuel.

Figure 2:
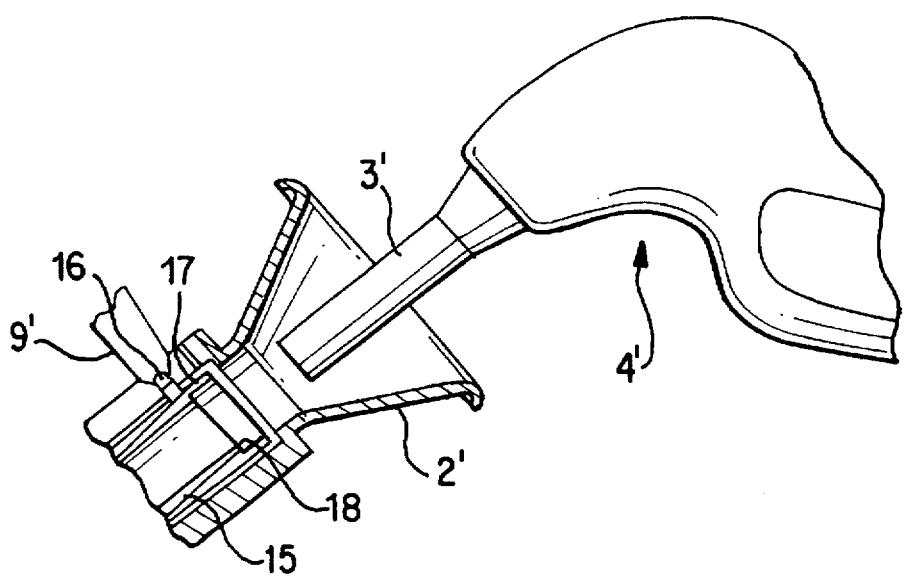
FIG. 2 is a detail from the upper region of the filler neck, with an alternative drive member of the actuating mechanism of the closing device.

While the drive lever 9 projects directly into the filler neck 2 and is actuated there by direct contact by the nozzle 3 of the filling pump 4 in the design of the closing device according to FIG. 1, in the design according to FIG. 2 an additional actuating member is interposed between the lever 9' and the nozzle 3'. This additional member is a sliding sleeve 15 which is mounted longitudinally displaceably in the filler neck 2'. By means of a boss 16, this sliding sleeve 15 actuates a drive lever 9' (shown schematically in dash lines) which, in this case, does not have to project into the filler neck 2.

The advantage of the design with a sliding sleeve 15 is that the nozzle 3' of the filling pump 4' can be placed sealingly onto the passage orifice of the sliding sleeve 15. A sealing connection of the nozzle 3' to the sliding sleeve 15 is thereby provided. If the sliding sleeve 15 too is displaceably mounted sealingly in the filler neck 2', a refuelling which is gas-tight relative to the atmosphere is possible, insofar as further measures are also provided, for example for a concentric gas return.

The sliding sleeve 15 possesses an orifice which is stepped relative to the nozzle 3', with the result that the nozzle 3' can be introduced into a radial collar 17 of the sliding sleeve and rests on its end face on a step 18. The force to be transmitted axially to the sliding sleeve by the nozzle 3' is introduced into this step 18.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Closing device for an opening in a filler neck leading into a motor vehicle fuel tank, comprising:

a cap sealingly engageable with the opening, an actuating member which is movable by insertion of a filling pump nozzle in said filler neck, a sliding sleeve mounted in the filler neck so as to be displaced in longitudinal direction of the filler neck by engagement with the nozzle, said sliding sleeve being configured to actuate the actuating member, and a control mechanism operably connecting the actuating member with the cap to control opening and closing movement of the cap with decreasing force on the cap in a cap closing direction during movement of the cap from a closed to an open position and with increasing force on the cap in a cap closing direction during movement of the cap from an open to a closed position.

2. Closing device according to claim 1, comprising a selectively openable protective cover closing an outward end of said filler neck at a spacing from the cap.

3. Closing device according to claim 1, wherein the actuating member is a drive lever.

4. Closing device according to claim 3, wherein the control mechanism includes a pivotally mounted cap carrying lever and a connecting lever pivotally connecting the cap carrying lever with the drive lever.

5. Closing device according to claim 1, wherein said control mechanism includes a spring continuously biasing the cap toward the closed position.

6. Closing device according to claim 5, wherein said spring is a leg spring.

7. Closing device according to claim 5, wherein the actuating member is a drive lever.

8. Closing device according to claim 7, wherein the control mechanism includes a pivotally mounted cap carrying lever and a connecting lever pivotally connecting the cap carrying lever with the driver lever.

9. Closing device according to claim 7, wherein said spring is disposed to engage with and continuously bias the drive lever towards a cap closing position, said spring having a rotational axis which is on a pivot axis for the drive lever.

10. Closing device for an opening in a filler neck leading into a motor vehicle fuel tank, comprising:

a cap sealingly engageable with the opening, said cap being mounted on a pivoting lever which is pivotable about a first fixed pivot connection;

an actuating member which is movable by insertion of a filling pump nozzle in said filler neck, said actuating member being pivotable about a second fixed pivot connection; and a control mechanism operably connecting the actuating member with the cap, said control mechanism including a coupling member which is articulated on the pivoting lever and on the actuating member.

11. Closing device according to claim 10, wherein said coupling member is articulated on the pivoting lever at a location between said first pivot connection and said cap, and said coupling member is articulated on the actuating member at a location between said second pivot connection and said filler neck.

12. Closing device according to claim 10, wherein the control mechanism operably connects the actuating member with the cap such that opening and closing movement of the cap is controlled with decreasing force on the cap in a cap closing direction during movement of the cap from a closed to an open position and with increasing force on the cap in a cap closing direction during movement of the cap from an open to a closed position.

13. Closing device according to claim 10, further comprising a sliding sleeve mounted in the filler neck so as to be displaced in a longitudinal direction of the filler neck by engagement with the nozzle, said sliding sleeve being configured to actuate the actuating member.

14. Closing device according to claim 10, further comprising a selectively openable protective cover closing an outward end of said filler neck at a spacing from the cap.

15. Closing device according to claim 10, wherein the actuating member is a drive lever which is pivotable by the pump nozzle.

16. Closing device according to claim 15, wherein the drive lever projects into the filler neck to be directly abuttingly engageable with the nozzle when the nozzle is inserted into the filler neck.

17. Closing device according to claim 10, wherein said control mechanism includes a spring continuously biasing the cap toward the closed position.

18. Closing device according to claim 17, wherein said spring is a leg spring.

19. Closing device according to claim 18, wherein said leg spring is disposed to engage with and continuously bias the actuating member towards a cap closing position, said leg spring having a rotational axis about said second fixed pivot connection.

* * * * *